(12) United States Patent
Fischer et al.

(10) Patent No.: US 8,397,559 B2
(45) Date of Patent: Mar. 19, 2013

(54) METHOD FOR INDIRECT TIRE PRESSURE MONITORING AND TIRE PRESSURE MONITORING SYSTEM

(75) Inventors: Daniel Fischer, Schwalbach (DE);
Markus Irth, Mainz-Kastel (DE);
Andreas Köbe, Bensheim (DE);
Christian Sußmann, Bad Soden (DE)

(73) Assignee: Continental Teves AG & Co. oHG (DE)

( * ) Notice: Subject to any disclaimer, the term of this patent is extended or adjusted under 35 U.S.C. 154(b) by 485 days.

(21) Appl. No.: 12/676,090

(22) PCT Filed: Sep. 1, 2008

(86) PCT No.: PCT/EP2008/061486
§ 371 (c)(1),
(2), (4) Date: Mar. 2, 2010

(87) PCT Pub. No.: WO2009/030660
PCT Pub. Date: Mar. 12, 2009

(65) Prior Publication Data
US 2010/0211250 A1     Aug. 19, 2010

(30) Foreign Application Priority Data

Sep. 3, 2007  (DE) .................... 10 2007 041 619
Aug. 20, 2008 (DE) .................... 10 2008 038 579

(51) Int. Cl.
*B60C 23/02* (2006.01)

(52) U.S. Cl. ...................................... 73/146.5

(58) Field of Classification Search .......... 73/146–146.8
See application file for complete search history.

(56) References Cited

U.S. PATENT DOCUMENTS

| | | | |
|---|---|---|---|
| 5,553,491 A | 9/1996 | Naito et al. | |
| 6,691,059 B1 * | 2/2004 | Griesser | 702/140 |
| 8,180,523 B2 * | 5/2012 | Edling et al. | 701/33.9 |
| 2002/0059826 A1 | 5/2002 | Ono et al. | |
| 2002/0095264 A1 | 7/2002 | Kamiya et al. | |
| 2005/0268706 A1 | 12/2005 | Polzin | |
| 2006/0220811 A1 * | 10/2006 | Griesser et al. | 340/442 |
| 2007/0000316 A1 * | 1/2007 | Lauer et al. | 73/146.4 |
| 2008/0140276 A1 | 6/2008 | Griesser et al. | |

FOREIGN PATENT DOCUMENTS

| | | |
|---|---|---|
| DE | 100 58 140 A1 | 1/2002 |
| DE | 101 57 885 A1 | 10/2002 |
| DE | 103 03 492 A1 | 10/2003 |
| DE | 10 2005 004 910 A1 | 9/2005 |
| DE | 10 2005 031 485 A1 | 2/2006 |
| EP | 0 578 826 B1 | 7/1998 |
| EP | 1 640 189 A2 | 3/2006 |

* cited by examiner

*Primary Examiner* — Andre Allen
(74) *Attorney, Agent, or Firm* — RatnerPrestia

(57) ABSTRACT

A system and method for indirect tire pressure monitoring. A pressure loss variable (X, f, c) is determined based on an analysis of an oscillation behavior of a tire of a motor vehicle for the detection of a pressure loss in the tire of a wheel. A variable ($\alpha$, $\alpha/v$) representing an increase ($\alpha$) of a wheel torque slip curve, or depending on an increase ($\alpha$) of a wheel torque slip curve ($\alpha/v$), is determined from the oscillation behavior of the tire, and the variable ($\alpha$, $\alpha/v$) and the pressure loss variable (X, f, c) are used for detecting the pressure loss.

23 Claims, 5 Drawing Sheets

METHOD FOR INDIRECT TIRE PRESSURE MONITORING AND TIRE PRESSURE MONITORING SYSTEM

CROSS REFERENCE TO RELATED APPLICATIONS

This application is the U.S. national phase application of PCT International Application No. PCT/EP2008/061486, filed Sep. 1, 2008, which claims priority to German Patent Application No. 10 2007 041 619.0, filed Sep. 3, 2007, and German Patent Application No. 10 2008 038 579.4, filed Aug. 20, 2008, the contents of such application being incorporated by reference herein.

FIELD OF THE INVENTION

The invention relates to a method for indirect tire pressure monitoring and to a tire pressure monitoring system.

BACKGROUND OF THE INVENTION

Modern motor vehicles are increasingly using systems which contribute to active or passive protection of the occupants. Systems for tire pressure monitoring protect the vehicle occupants against vehicle damage which is caused, for example, by an abnormal tire air pressure. By way of example, an abnormal tire air pressure can increase the tire wear and the fuel consumption, and can lead to a tire defect ("tire bursting"). Various tire pressure monitoring systems are already known, which either operate on the basis of direct-measuring sensors or identify an abnormal tire pressure by evaluation of the rotation-speed or oscillation characteristics of the vehicle wheels.

DE 100 58 140 A1, which is incorporated by reference, discloses a so-called indirectly measuring tire pressure monitoring system, which detects a tire pressure loss by evaluation of the wheel rotational movement (DDS: Deflation Detection System).

EP 0 578 826 B1, which is incorporated by reference, discloses a tire pressure measurement device which determines a pressure loss in a tire on the basis of tire oscillations, with at least one resonant frequency component being extracted from the tire oscillations.

Patent application DE 10 2005 004 910 A1, which is incorporated by reference, discloses a method for indirect tire pressure monitoring which improves an indirectly measuring tire pressure monitoring system that is based on the evaluation of wheel rotational movement, taking account of the eigen torsion frequency of the tires.

In the case of indirect tire pressure monitoring systems which are known from the prior art, a frequency analysis of the wheel velocity of the individual wheels is frequently carried out in order to identify a wheel-specific reduced air pressure. For this purpose, the torsion eigen oscillation, which is dependent on the air pressure, of the tire is normally used for air pressure monitoring. The eigen frequency or resonant frequency of the torsional oscillation between the rim and the radial belt varies as a result of a pressure loss, because the torsional spring constant between the radial belt and the rim decreases when the tire pressure is reduced. Any pressure loss is therefore deduced from a change/reduction in an eigen or resonant frequency, and an appropriate warning is emitted. However, the eigen frequency or resonant frequency varies not only as a result of a change in the tire pressure but also as a result of further disturbance variables. If these influences are ignored, this can lead to spurious warnings or else to correct warnings not being produced.

SUMMARY OF THE INVENTION

One object of the invention is therefore to provide an improved method for indirect tire pressure monitoring on the basis of an analysis of the oscillation behavior of a wheel, in which method disturbance influences which influence the pressure loss identification, for example changes in the roadway coefficient of friction and/or changes in the wheel load and/or changes in the speed of travel, are taken into account.

For the purposes of the invention, the term "angular velocity" should be understood as a generalized form of this expression. For example, the term also means all other rotational movement variables which are directly linked to the angular velocity, for example the revolution time, rotation speed or rotational velocity.

The invention is based on the idea that, in the case of a tire pressure monitoring method which identifies any pressure loss on the basis of a pressure loss identification variable, a characteristic variable is taken into account which represents a gradient of a wheel torque slip curve or depends on a gradient of a wheel torque slip curve. In this case, the characteristic variable is determined at least partially from the oscillation behavior of the wheel.

An analysis of the torsional oscillation behavior of the wheel is preferably carried out in order to determine the characteristic variable and/or the pressure loss identification variable. The analysis is particularly preferably carried out on the basis of a frequency analysis of the rotation speed signal from the wheel, in which a resonant frequency and/or at least one amplitude value of a frequency spectrum, advantageously the profile of the frequency spectrum in at least one frequency range, is determined. Alternatively or additionally, it is particularly preferable for the analysis to be carried out on the basis of a model with parameters, wherein those parameters of the model from which the characteristic variable and/or the pressure loss identification variable are/is then determined are determined by evaluation of the measured wheel rotation speed signal.

The characteristic variable preferably corresponds to a quotient of a gradient of a wheel torque slip curve and a vehicle speed, since this also takes account of the vehicle speed, in addition to the gradient of the wheel torque slip curve, which depends on the wheel load and the coefficient of friction between the roadway and the tire.

According to one preferred embodiment of the method according to aspects of the invention, the characteristic variable is taken into account by using the characteristic variable to correct the pressure loss identification variable. The disturbance influences contained in the characteristic variable are calculated out of the pressure loss identification variable in this way. A warning is then produced on the basis of the corrected, undisturbed pressure loss identification variable, thus very largely avoiding spurious warnings.

Alternatively or additionally, the pressure loss identification variable is preferably determined as a function of the determined characteristic variable. For example, if the value of the characteristic variable is low (lower than a first predetermined threshold value), then a resonant frequency in a first predetermined frequency range is advantageously used as the pressure loss identification variable and, if the value of the characteristic variable is high (higher than a second predetermined threshold value), a resonant frequency in a second predetermined frequency range is advantageously used as the pressure loss identification variable. The pressure loss can therefore be identified as a function of the situation, leading to more reliable warning.

The characteristic variable is preferably determined from a ratio of two dimension variables, wherein one dimension variable represents the energy content of the oscillation behavior of the wheel at a first resonant frequency, or in a frequency range close to a first resonant frequency, and the other dimension variable represents the energy content of the oscillation behavior of the wheel at a second resonant frequency, or in a frequency range close to a second resonant frequency. The formation of an energy ratio offers the advantage that the energy ratio is independent of the absolute energy content of the spectrum. This is because the absolute energy may differ widely depending on the speed of travel and the condition of the roadway.

According to one development of the invention, a frequency analysis of the oscillation behavior of the wheel is carried out, and the characteristic variable is determined from the determined frequency spectrum. A discrete Fourier transformation of the angular velocity signal from the wheel is particularly preferably carried out for this purpose. Frequency analysis methods and Fourier transformation methods such as these are known per se from the prior art, and can easily be carried out, for example, in the electronic control unit of a brake controller.

The characteristic variable is preferably determined from the ratio of the amplitude values of the frequency spectrum at two predetermined or determined resonant frequencies. Therefore, for this purpose, the frequency spectrum (amplitude of the frequency spectrum) need be determined only in the region of the resonant frequencies, and it is not absolutely essential to determine the frequency spectrum in a wide frequency range, thus making it possible to reduce the computation complexity and/or the memory space.

Alternatively, the characteristic variable is preferably determined from the ratio of the energy contents of the frequency spectrum in the regions of two predetermined or determined frequency ranges. The energy content of the frequency spectrum in a frequency range is calculated particularly preferably by numerical integration of the amplitude of the frequency spectrum over the frequency range. The consideration of a frequency range, rather than a single resonant frequency, offers the advantage of averaging, which means that a single amplitude value which, for example, is not correct does not have such a major influence on the determination of the characteristic variable.

According to another development of the invention, the characteristic variable is determined from the time profile of an angular velocity signal from the wheel, particularly preferably by filtering of the signal by at least one bandpass filter. There is therefore no need for complex Fourier analysis of the signal, and the characteristic variable can be determined more cost-effectively.

The angular velocity signal from the wheel is preferably filtered by at least two bandpass filters, wherein the cut-off frequencies of one filter are around a first predetermined or determined resonant frequency, and the cut-off frequencies of the other filter are around a second predetermined or determined resonant frequency. The characteristic variable is then determined from the ratio of the variances of the two filtered signals, since the variance represents a measure of the energy content of the oscillation behavior of the wheel in the frequency band under consideration.

The resonant frequencies and the frequency ranges are preferably first of all predetermined in the form of fixed, predetermined default values. More accurate or improved resonant frequencies and frequency ranges are then determined by evaluation of the specific frequency spectra, and are used for further determination of the characteristic variable.

According to another development of the invention, a model-based analysis of the oscillation behavior of the wheel is carried out, wherein at least one parameter of the basic model or of the basic model-based equation is determined by parameter estimation. In this case, the characteristic variable is determined from the determined parameter or parameters.

For pressure loss identification, it is likewise preferable to use a pressure loss identification variable which corresponds to a parameter in the model or is determined from the parameter or parameters in the model. Determining the parameters in the model makes it possible to determine associated value pairs of the characteristic variable and pressure loss identification variable.

According to another preferred embodiment of the method according to aspects of the invention, the pressure loss identification is based on a resonant frequency, determined on the basis of the frequency analysis, as the pressure loss identification variable.

The frequency spectra are preferably evaluated as a function of the characteristic variable, in order to take account of the disturbance variables. They are particularly preferably evaluated at intervals of the characteristic variable (characteristic value classes), in order to reduce the evaluation complexity.

A value of the characteristic variable is preferably determined for each determined frequency spectrum. The determined frequency spectra are then averaged with values of the characteristic variable which are located within a predetermined value range (a characteristic value class), and a pressure loss identification variable is determined from the averaged frequency spectrum. Associated value pairs of characteristic variable and pressure loss identification variable are thus determined, and are particularly preferably used as comparison values for pressure loss identification and/or for determining a correction for the pressure loss identification variable.

The value of the characteristic variable is preferably used to decide whether or not the associated pressure loss identification variable is used for pressure loss monitoring.

According to one development of the method according to aspects of the invention, in a learning phase, value pairs are learnt for the characteristic variable and the pressure loss identification variable. These are then used as comparison values in a subsequent pressure loss monitoring phase. Currently determined value pairs are compared with the comparison values in the pressure loss monitoring phase in order to identify a tire pressure loss. The learnt comparison value of the pressure loss identification variable is advantageously compared with the current value of the pressure loss identification variable for the same value of the characteristic variable (or the same characteristic value class). If the two values differ from one another by a predetermined threshold value, then a warning is emitted. Spurious warnings can be avoided by comparison of the pressure loss identification variable with similar characteristic variables.

According to another development of the method according to aspects of the invention, in a learning phase, value pairs are learnt for the characteristic variable and the pressure loss identification variable, and a functional relationship between at least the characteristic variable and the pressure loss identification variable is determined from the value pairs. Currently determined pressure loss identification variables are corrected on the basis of the functional relationship in the subsequent pressure loss monitoring phase. Spurious warnings are therefore avoided by taking account of the characteristic variable.

The specific characteristic variable is preferably evaluated in order to determine a gradient of the wheel torque slip curve. The vehicle speed, which is normally determined by a vehicle control system (for example on the CAN bus), is particularly preferably taken into account for this purpose. A change in the coefficient of friction between the roadway and the tire and/or a change in the load of the vehicle are/is preferably identified from the gradient, for example together with other information or data.

One advantage of the method according to aspects of the invention is that it allows reliable, wheel-specific tire pressure loss monitoring. Influences of disturbance variables on the pressure loss identification are minimized.

The invention also relates to a tire pressure monitoring system in which a method as described above is carried out.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
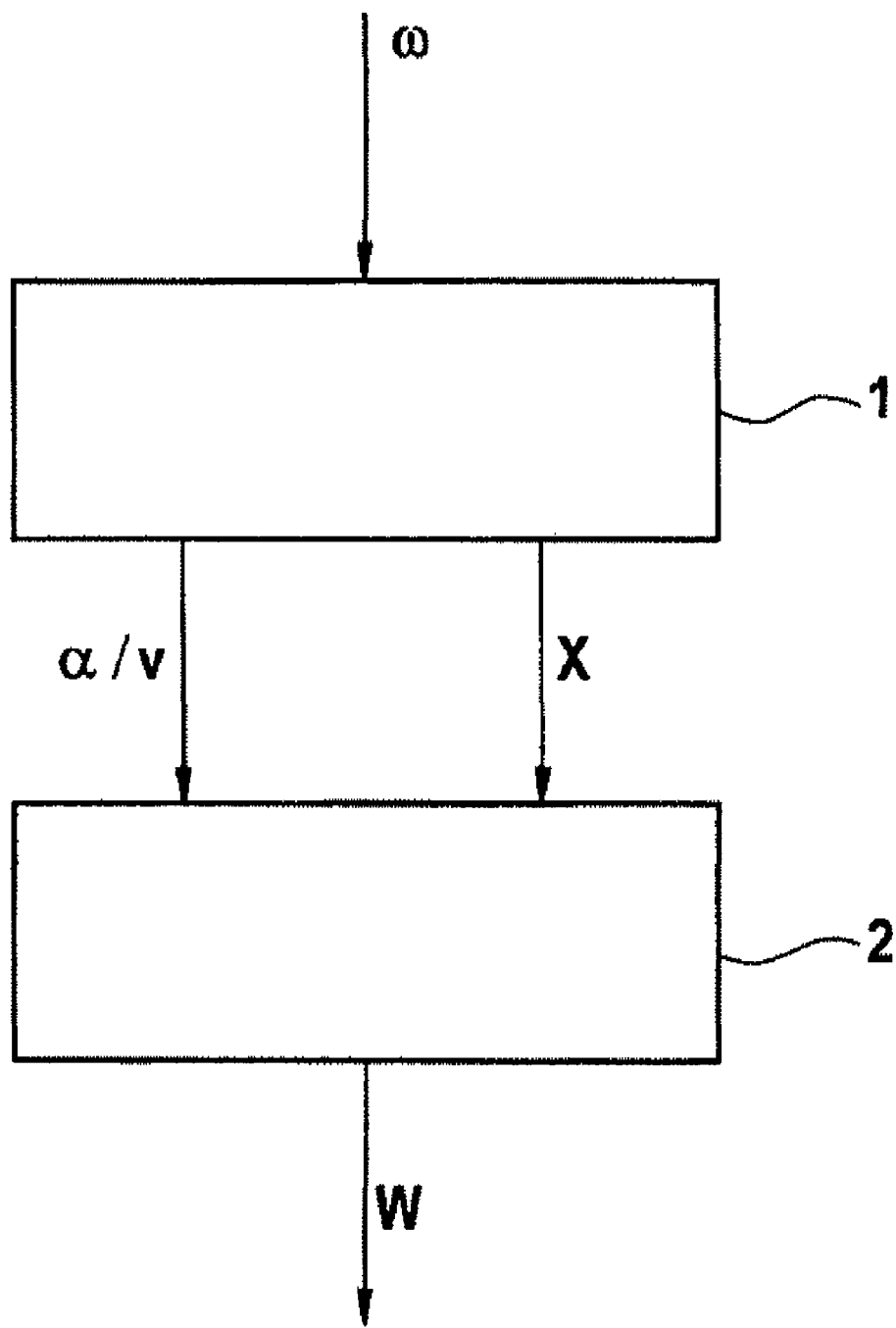
FIG. 1 shows a flowchart of a first exemplary embodiment of a method according to aspects of the invention.

FIG. 1 shows, schematically, a flowchart of a first exemplary embodiment of a method according to aspects of the invention. An analysis of the oscillation behavior of the wheel is carried out in block 1, using a wheel rotation speed signal $\omega$ from a wheel. A characteristic variable $\alpha/v$, which depends on a gradient $\alpha$ of a wheel torque slip curve and the vehicle speed v, and a pressure loss identification variable X are determined from the oscillation behavior of the wheel, in order to identify any pressure loss in the tire on the wheel. A check is then carried out in block 2, taking account of the characteristic variable $\alpha/v$ and on the basis of the pressure loss identification variable X, to determine whether any pressure loss has occurred. If a pressure loss is identified, then a warning W is emitted, for example to the driver.

By way of example, the torsion eigen oscillation of the tire, which is dependent on the tire air pressure, is used for air pressure monitoring. Apart from the air pressure, however, disturbance variables, for example road stimuli, also have an influence on this oscillation, and therefore on the pressure loss identification variable X. If such influences are ignored or not considered, this can lead to spurious warnings or else to correct warnings from the tire pressure loss monitoring system not being produced.

The major disturbance variables which are considered and compensated for, for example, are:

road influences/coefficient of friction,
speed and
load.

By way of example, the influences of the said disturbance variables are fed back to the characteristic variable $\alpha/v$ which results as the quotient of $\alpha$ and v. In this case, $\alpha$ represents the gradient of the torque slip curve of the tire at the respective operating point, and v represents the speed of the vehicle.

In order to achieve improved tire pressure monitoring, the changes in the $\alpha/v$ factor must be taken into account when determining or assessing the pressure loss identification variable X as has been determined from the oscillation behavior of the tire.

Exemplary embodiments of one method according to aspects of the invention will be described in the following text, relating either to the determination of the characteristic variable $\alpha/v$ or the consideration of the characteristic variable $\alpha/v$ in the pressure loss identification, for example the use of the characteristic variable $\alpha/v$ for compensation of the pressure loss identification variable X (calculating out the disturbance influences).

According to a second exemplary embodiment, a frequency analysis of the wheel rotation speed signal $\omega$ is carried out in order to determine a characteristic variable $\alpha/v$. For this purpose, the frequency spectrum of the wheel rotation speed signal $\omega$ is calculated by discrete Fourier transformation. The energy ratio $A_{ratio}$ of the frequency energy content $E_1$ around a lower eigen frequency $f_{eigen1}$ is determined with respect to the frequency energy content $E_2$ around an upper eigen frequency $f_{eigen2}$ as a measure of the characteristic variable $\alpha/v$:

$$\alpha/v \sim E_1/E_2 \qquad (1)$$

By way of example, the frequency energy contents $E_1$, $E_2$ are determined by numerical integration of the frequency spectrum in an appropriate frequency range around the eigen frequency $f_{eigen1}$ or $f_{eigen2}$, respectively.

According to a third exemplary embodiment, the wheel rotation speed signal $\omega$ is filtered by a bandpass filter with cut-off frequencies around a lower eigen frequency $f_{eigen1}$ and around a high eigen frequency $f_{eigen2}$. By way of example, the variance of the filtered signal is used as a measure of the energy $E_1$ or $E_2$ in the respective ranges. The characteristic variable $\alpha/v$ is determined using equation (1).

In the second and third exemplary embodiments, the frequency range around two eigen frequencies $f_{eigen1}$ and $f_{eigen2}$ is evaluated. The eigen frequencies $f_{eigen1}$ and $f_{eigen2}$ and/or the respective frequency ranges around the eigen frequencies $f_{eigen1}$ and $f_{eigen2}$ can either be predetermined as being fixed, or can be determined in advance by measurement and/or calculation. By way of example, predetermined values are first of all used as initial values. The resonant frequencies which have already been found are used later for more accurate/improved determination of which frequency intervals are used to calculate the energies $E_1$ and $E_2$.

According to a fourth exemplary embodiment, a model-based analysis of the oscillation behavior of the wheel is carried out. A model is assumed for this purpose. The parameters of the basic model and/or of the basic model-based equation are determined by a parameter estimation method, on the basis of the model. An estimated value for $\alpha/v$ is determined from the coefficients. The eigen frequency $f_{eigen1}$, $f_{eigen2}$ is likewise calculated from the parameters, and is then used as the pressure loss identification variable X.

By way of example, a third-order model can be used as the basis, corresponding to the description further below (see equation (2)). The initial factors in the denominator on the right-hand side of equation (2) before $s^3$, $s^2$ and s are determined by a parameter estimation method. In this case, the values of $s^3$, $s^2$ and s are obtained by higher-order derivatives with respect to time of the angular velocity ω, and can therefore be determined from the measured angular velocity ω. The various initial factors contain the characteristic variable α/v, and represent a (non-linear) equation system, wherein the characteristic variable α/v and the spring constant c (or the quotient $c/J_{rim}$) are the variables to be determined. The sought variables α/v and c are determined by solving the equation system.

A characteristic variable α/v determined, for example, according to the second, third or fourth exemplary embodiment is then used as a compensation variable for a pressure loss identification variable X found from an oscillation analysis. By way of example, the pressure loss identification variable X is a resonant frequency $f_{eigen}$.

Depending on whether the pressure loss identification variable X is determined using a parametric (model-based) approach or else a non-parametric (Fourier transformation) approach, this results in different compensation options, which will be described in the following text in the form of exemplary embodiments.

According to a fifth exemplary embodiment, a frequency analysis is carried out on the wheel speed ω in order to analyze the oscillation behavior of the wheel. The torsion eigen oscillation of the tire, which is dependent on the air pressure, is used for air pressure monitoring. The frequency analysis results in an eigen frequency or resonant frequency $f_{eigen}$ which depends on the tire air pressure, and is therefore used as the pressure loss identification variable X. By way of example, the tire pressure loss identification method comprises a learning phase in which the eigen frequency or resonant frequency $f_{eigen}^{learn}$ of the tire at the correct or predetermined air pressure is determined and learnt by a frequency evaluation method. After the learning process, changes in the eigen frequency $f_{eigen}$ in the direction of a lower eigen frequency are monitored in a comparison phase and, if a detection threshold S (that is to say $|f_{eigen}^{learn} - f_{eigen}| > S$) is exceeded, a pressure loss is deduced, and the driver is informed.

According to the example, for non-parametric spectral analysis methods, the calculated individual spectra are subdivided into α/v classes in accordance with their determined α/v value, and are filtered in these classes (corresponding to a filtered/averaged overall spectrum comprising a plurality of individual spectra). The appropriate resonant frequency $f_{eigen}$ is determined and learnt ($f_{eigen}^{learn}$) for each α/v class. In the comparison phase, a currently determined eigen frequency $f_{eigen}$ is compared, corresponding to its α/v value, with the learnt eigen frequency $f_{eigen}^{learn}$ of the corresponding α/v class.

According to the example, an upper resonant frequency $f_{eigen2}$ is detected as the pressure loss identification variable X for low values of α/v, while a lower resonant frequency $f_{eigen1}$ is detected as the pressure loss identification variable X for high values of α/v. A signal which cannot be evaluated may occur in a transitional range, for which reason these spectra are not used, for example, for calculation of a pressure loss identification variable X.

According to a sixth exemplary embodiment, the parameters (coefficients) of the third-order model (see below, equation (2)) are estimated using a parametric estimation method, and the pressure loss identification variable X is calculated therefrom, in addition to the characteristic variable α/v. The value pair (pressure loss identification variable X, characteristic variable α/v) are learnt jointly in a learning phase, and the parameters of a matching compensation function g (see further below, functional relationship g) are likewise also estimated and learnt. Further features of the compensation method will be described further below (see the ninth exemplary embodiment).

According to a seventh exemplary embodiment (parametric estimation method), the third-order model is subdivided into two second-order models, which respectively result for the limit cases α/v→0 and α/v→∞ (see for example equations (3) and (5)). This subdivision offers the advantage of requiring less computation complexity for the parameter estimation than in the case of the third-order model. Only one of the two models is calculated through, and the pressure loss identification variables X determined by this model are used or rejected on the basis of the calculated α/v value. The model for α/v→∞ is preferably used, since the lower resonance at about 50 Hz is evident for most driving conditions. The model for α/v→0 is then ignored.

According to an eighth exemplary embodiment (parametric estimation method), the third-order model is split into two second-order models, which respectively result for the limit cases α/v→0 and α/v→∞ (see for example equations (3) and (5)). Both models are calculated for the limit cases of α/v, and the pressure loss identification variables X from one model or the other are in each case used, depending on the α/v value that is determined.

According to a ninth exemplary embodiment, at least compensation of the pressure loss identification variable X (preferably the eigen frequency f) is carried out with respect to a disturbance variable Y, for example the disturbance influence α/v. According to the example, the compensation method is used for a parametric analysis method or for a non-parametric analysis method. The compensation method described in the following text is therefore preferably additionally carried out in the examples of the methods described above. In this case, a functional relationship g (for example a linear relationship), specifically the parameters of the assumed functional relationship g, is learnt on the basis of determined (X, Y) value pairs and describes the change in the pressure loss identification variable X from a pressure-dependent learnt variable X0 and the disturbance influence Y (for example α/v), and possibly further variables:

$$X = g(X0, Y, \ldots)$$

By way of example, a linear relationship is obtained by regression because this can be determined easily:

$$X = X0 + a*Y,$$

where the parameters X0, a of the linear equation are determined, for example by fitting of the (X, Y) value pairs, in a learning phase. The parameter X0 then corresponds to the learnt comparison value for the subsequent comparison phase.

The currently determined pressure loss identification variable X is compensated by the reciprocal function $g^{-1}$ for pressure loss identification in the comparison phase.

According to the example, the currently determined pressure loss identification variable $X_{current}$ is for this purpose compensated using $X_{comp} = X_{current} - a*Y$, and the compensated pressure loss identification variable $X_{comp}$ is compared with the comparison value X0 that has been learnt. If the discrepancy $|X_{comp} - X0|$ is greater than a predetermined threshold, then a pressure loss is identified.

Alternatively, the variable $X_{current} - (X0 + a*Y)$ is calculated directly, and a pressure loss is identified if the discrepancy from zero is greater than a predetermined threshold.

According to a tenth exemplary embodiment, the determined characteristic variable α/v is used in order to deduce other physical variables, for example the coefficient of friction between the roadway and the tire, and/or the load.

The variable α is dependent on the wheel load (load) and the coefficient of friction of the roadway. The vehicle speed v is known in the vehicle, from which α itself can be deduced from an estimated magnitude for α/v. In conjunction with a plausibility check with respect to time (for example the load does not change during a journey) and/or with the assistance of other variables, for example variables from the wheel circumference analysis of the tires (in particular the axle ratio), a change in α can be used to deduce the load or a change in the coefficient of friction.

One example of a model will be explained in the following text, which can be used to describe a model-based analysis of the oscillation behavior of a wheel.

Figure 2:
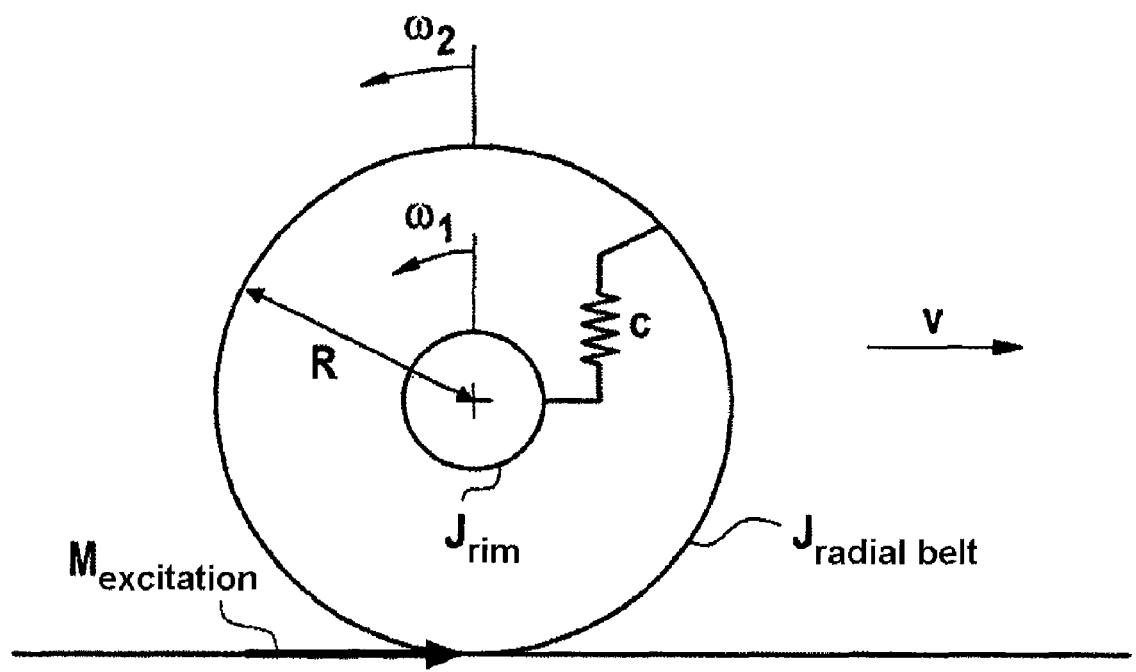
FIG. 2 shows a model of a wheel.

FIG. 2 schematically illustrates a model of the wheel. The wheel is described by the moment of inertia of the rim $J_{rim}$ and the moment of inertia of the tire radial belt $J_{radial\ belt}$.

The torsional spring constant between the radial belt and the rim is denoted c. The rotational velocity of the radial belt, which corresponds to the rotation speed of the wheel circumference, is described by the angular velocity $\omega_2$, and the rotational speed of the rim which, for example, is measured by means of a wheel rotation speed sensor, is described by the angular velocity $\omega_1$. The radius of the tire is denoted R.

One physical effect which is made use of for tire pressure loss monitoring is the change in the eigen frequency or resonant frequency $f_{eigen}$ of the torsional oscillation between the rim and the radial belt resulting from a pressure loss. This change is based on the reduction of the torsional spring constant c between the radial belt and the rim when there is a reduced pressure in the tire.

The excitation moment $M_{excitation}$ acting on the radial belt is, according to the model, described by the following slip equation:

$$M_{excitation} = \alpha \cdot R \cdot \frac{v - \omega_2 \cdot R}{v}$$

Once the differential equations have been created, the slip equation has been used and a transfer has been made to the frequency domain (Laplace transformation with the Laplace variables s), this results in the following transfer function G between an excitation moment $M_{excitation}$ acting on the radial belt and an angular velocity $\omega_1$ which can be measured by a wheel rotation speed sensor (equation (2)):

$$G = \frac{\omega_1}{M_{excitation}} = \frac{1}{\frac{J_{rim} \cdot J_{radial\ belt}}{c} \cdot s^3 + \frac{J_{rim} \cdot R^2}{c} \frac{\alpha}{v} \cdot s^2 + (J_{rim} + J_{radial\ belt}) \cdot s + \frac{R^2 \alpha}{v}}$$

The moment of inertia of the rim $J_{rim}$, of the radial belt $J_{radial\ belt}$, the tire radius R and the spring constant c can be assumed to be constant for a vehicle without a tire change and without any change in the tire pressure.

The speed v and the gradient of the torque slip relationship α are variable while driving.

Figure 3:
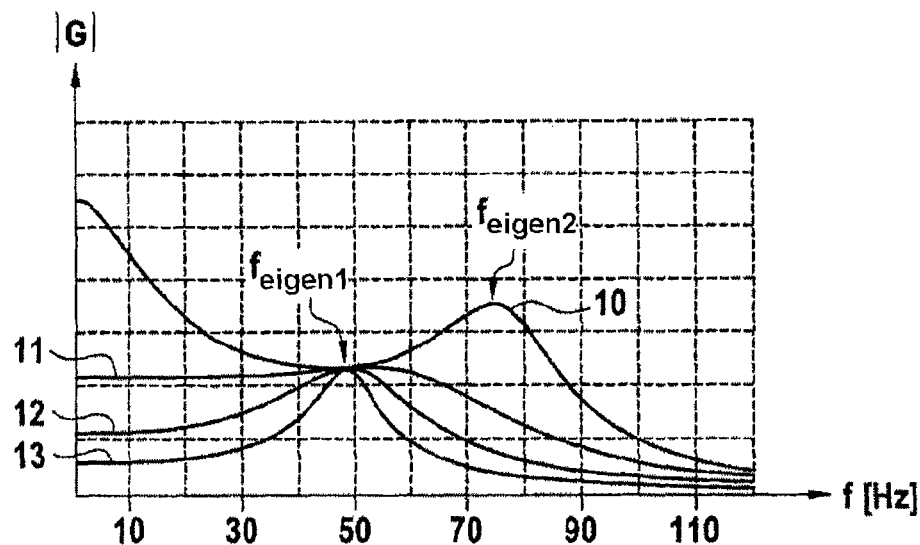
FIG. 3 shows an example of a relationship between a transfer function and frequency for various values of the characteristic variable.

The magnitude of the transfer function |G| of the system varies as a function of the frequency f (the torsional oscillation) with the varying quotient α/v, corresponding to the relationship shown by way of example in FIG. 3. Each of the illustrated curves 10, 11, 12, 13 corresponds to a different value of α/v (rising values of α/v for the curves 10 to 13). Depending on the quotient α/v, either a resonant frequency $f_{eigen1}$ in the region of about 45 Hz or else a resonant frequency $f_{eigen2}$ in the region of about 75 Hz can be seen. A pronounced resonance at a resonant frequency $f_{eigen2}$ can be seen for the lowest illustrated value of α/v, and a pronounced resonance at a resonant frequency $f_{eigen1}$ is formed for the highest illustrated value of α/v (curve 13).

In the limit case in which α/v tends to zero (that is to say high speeds and/or a smooth roadway), the transfer function G is as follows:

$$G = \frac{\omega_1}{M_{excitation}} = \frac{1}{s \cdot \left(\frac{J_{rim} \cdot J_{radial\ belt}}{c} \cdot s^2 + (J_{rim} + J_{radial\ belt})\right)} \quad (3)$$

The eigen frequency of the system becomes (corresponding to a high eigen frequency $f_{eigen2}$):

$$f_{eigen2} = \frac{\sqrt{\frac{c(J_{rim} + J_{radial\ belt})}{J_{rim} \cdot J_{radial\ belt}}}}{2\pi} \quad (4)$$

For the other limit case in which α/v tends to infinity, the transfer function is:

$$G = \frac{\omega_1}{M_{excitation}} = \frac{c \cdot v}{J_{rim} \cdot R} \cdot \frac{1}{s^2 + \frac{(J_{rim} + J_{radial\ belt}) \cdot c \cdot v}{J_{rim} \cdot R^2 \cdot \alpha} \cdot s + \frac{c}{J_{rim}}} \quad (5)$$

The eigen frequency of the system becomes (corresponding to a low eigen frequency $f_{eigen1}$):

$$f_{eigen1} = \frac{\sqrt{\frac{c}{J_{rim}}}}{2\pi} \quad (6)$$

Figure 4:
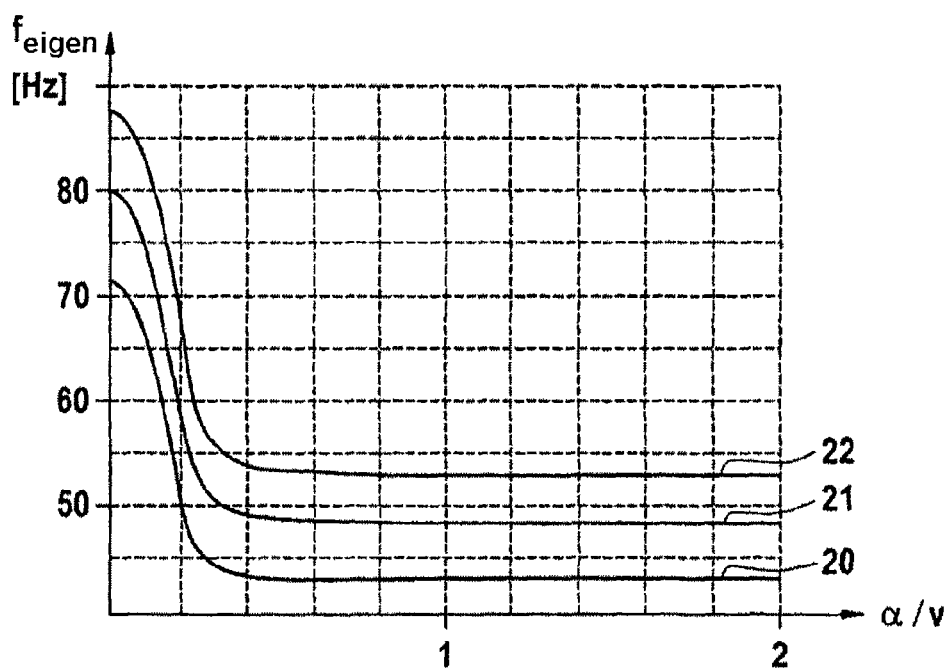
FIG. 4 shows examples of profiles of the resonant frequency plotted against the characteristic variable.

FIG. 4 schematically illustrates examples of profiles of the resonant frequency $f_{eigen}$ with the characteristic variable α/v, with each curve 20, 21, 22 corresponding to a different value of the torsional spring constant c, and therefore a different tire pressure. The upper curve 22 corresponds to the highest spring constant, and the lower curve 20 corresponds to the lowest spring constant (rising values of c for the curves 20 to 22).

The high eigen frequency $f_{eigen2}$ is pronounced for low values of the characteristic variable α/v, and the system enters a transitional range as α/v rises, with the lower resonant frequency $f_{eigen1}$ then being pronounced as α/v rises even further.

Figure 5:
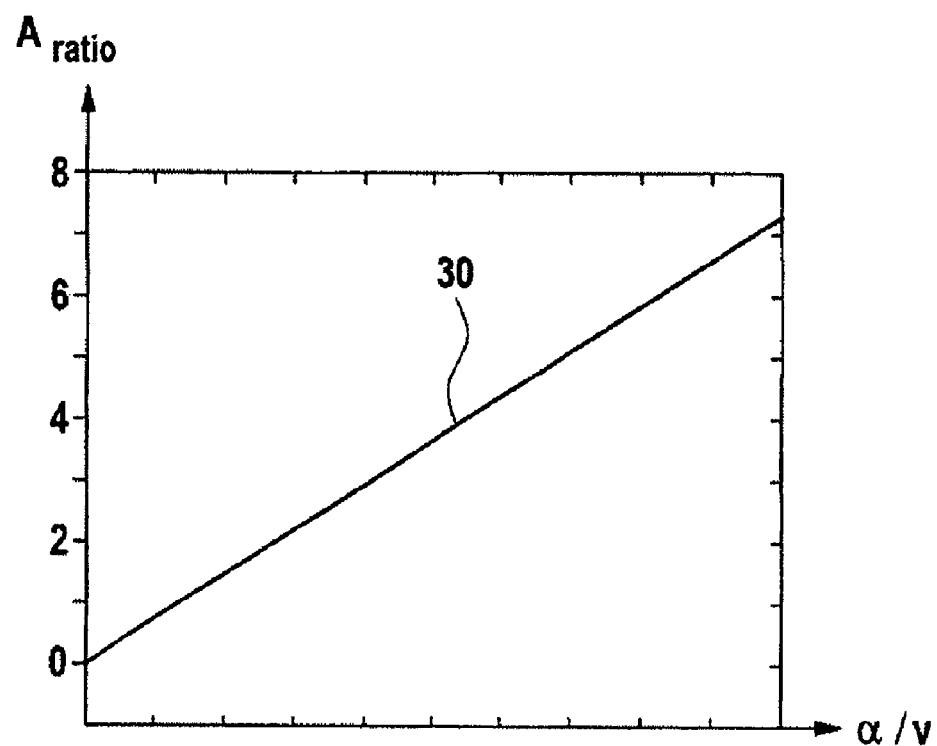
FIG. 5 shows an example of a relationship between an amplitude ratio and a characteristic variable.

It is self-evident that the amplitude ratio $A_{ratio}$ of the transfer function G to the eigen frequencies $f_{eigen1}$ and $f_{eigen2}$ $$A_{ratio} = \frac{|G(f_{eigen1})|}{|G(f_{eigen2})|} \quad (7)$$

is linearly dependent on the characteristic variable α/v. By way of example, FIG. 5 shows a linear relationship 30 between the amplitude ratio $A_{ratio}$ and $\alpha/v$, in a schematic form. The characteristic variable $\alpha/v$ is therefore, according to one exemplary embodiment, determined from the amplitude ratio $A_{ratio}$ of the transfer function to the eigen frequencies $f_{eigen1}$ and $f_{eigen2}$.

An approximately linear relationship also occurs when the energy content $E_1$, $E_2$ of the spectrum around the respective eigen frequency $f_{eigen1}$, $f_{eigen2}$ is used in the ratio (instead of the transfer function at the eigen frequencies).

$$A_{ratio} = \frac{|E_1|}{|E_2|} = \frac{\left|\int_{f_{eigen1}-\Delta f_1}^{f_{eigen1}+\Delta f_1} G \cdot df\right|}{\left|\int_{f_{eigen2}-\Delta f_2}^{f_{eigen2}+\Delta f_2} G \cdot df\right|} \quad (8)$$

According to the example, the energy content is calculated in a frequency range by the integral over the transfer function G (for example the frequency ranges $f_{eigen1}-\Delta f_1$ to $f_{eigen1}+\Delta f_1$ and $f_{eigen2}-\Delta f_2$ to $f_{eigen2}+\Delta f_2$ although each frequency interval can also be arranged asymmetrically around the eigen frequency).

Figure 6:
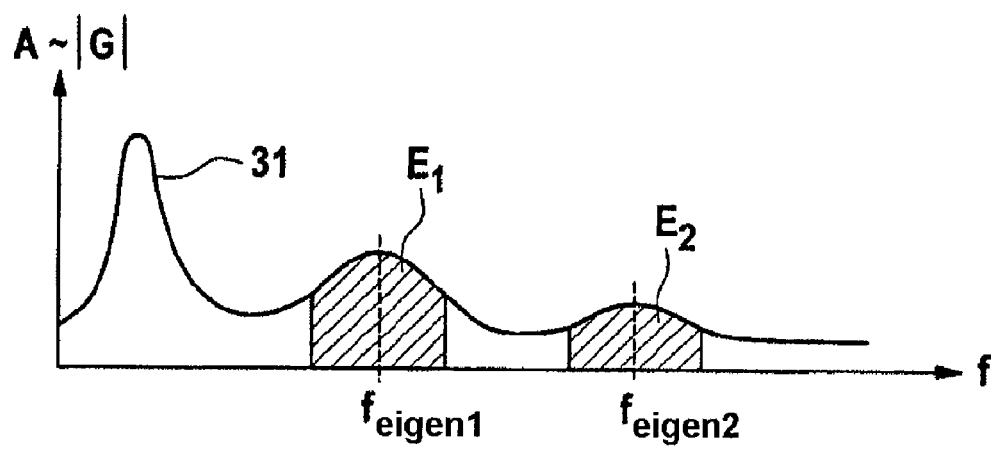
FIG. 6 shows an example of a frequency spectrum.

FIG. 6 schematically illustrates one example of the frequency spectrum (curve 31). The energy content $E_1$, $E_2$ around the eigen frequency $f_{eigen1}$, $f_{eigen2}$ is shown in a shaded form.

Since the respective ratio $A_{ratio}$ is assumed to be an approximately linear function of the characteristic variable $\alpha/v$ $$A_{ratio} \infty \frac{\alpha}{v},$$

it is possible to deduce the characteristic variable $\alpha/v$ via the frequency amplitudes $G(f_{eigen1})$, $G(f_{eigen2})$ at the natural frequencies or via the energies $E_1$, $E_2$ in the respective frequency ranges (around $f_{eigen1}$ and $f_{eigen2}$).

Figure 7:
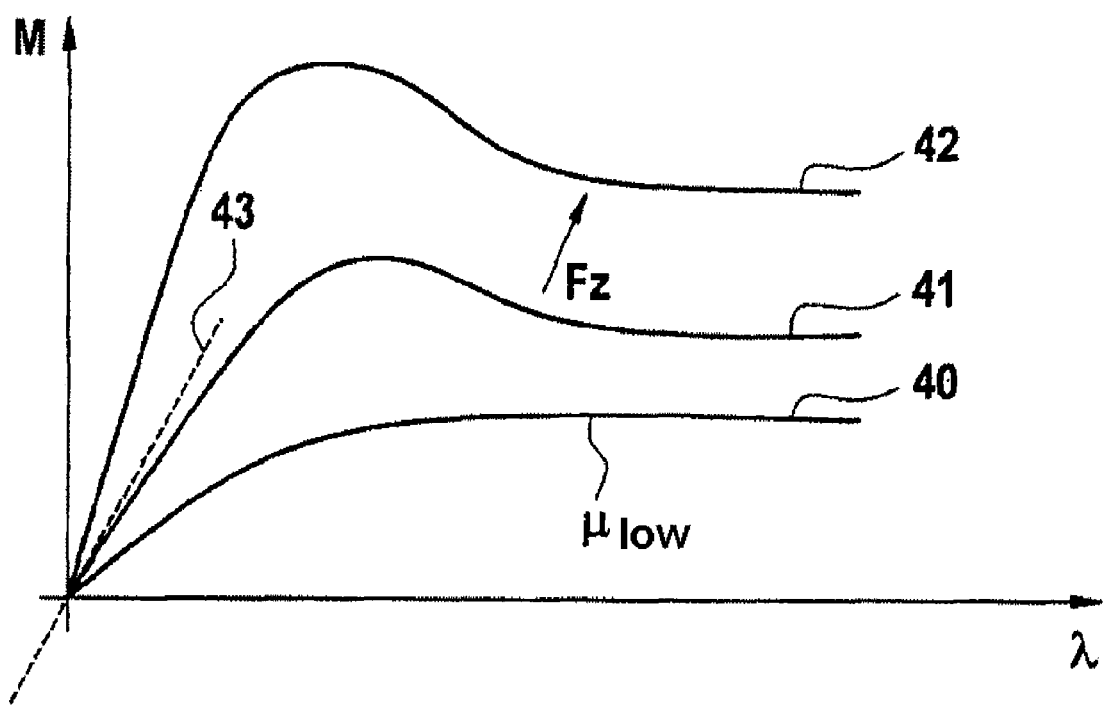
FIG. 7 shows examples of the relationships between the torque and the slip.

The torque-slip curve of a tire is dependent on the coefficient of friction μ and the wheel load Fz. FIG. 7 schematically illustrates examples of curves 40, 41, 42 of the torque M as a function of the slip λ for a varying coefficient of friction μ and wheel load Fz. The variable α represents the rise in the torque M as a function of the change in the slip $\lambda(\lambda=(v-\omega_2R)/v)$, that is to say the variable α can be considered to be the gradient of a torque-slip curve at one (operating) point (the dashed line 43 indicates a gradient α for the curve 41).

All the variables which change the variable α have an influence on the transfer function G and the pronounced resonant frequency or frequencies $f_{eigen1}$, $f_{eigen2}$.

In general, a low coefficient of friction $\mu_{low}$ leads to a lower α (curve 40 in FIG. 7).

Depending on the operating point (drive torque/braking torque) considered on the torque-slip curve, α will vary. α generally falls for higher slip values λ and torques M.

An increased wheel load Fz (indicated by an arrow in FIG. 7) leads to a rising α.

The invention claimed is:

1. A method for indirect tire pressure monitoring for use with a motor vehicle comprising,
   determining a pressure loss identification variable (X, f, c) for identification of a pressure loss at a tire of a wheel of the motor vehicle,
   analyzing an oscillation behavior of the wheel,
   determining a characteristic variable (α, α/v), which correlates to a gradient (α) of a wheel torque slip curve, from the analyzed oscillation behavior of the wheel, and
   identifying pressure loss at the tire of the wheel using the characteristic variable (α, α/v) and the pressure loss identification variable (X, f, c).

2. The method as claimed in claim 1, wherein the pressure loss identification variable (X, f) is corrected, and/or the pressure loss identification variable (X, f) is determined as a function of the determined characteristic variable (α/v).

3. The method as claimed in claim 1, wherein the characteristic variable (α/v) is determined from a ratio ($A_{ratio}$) of two dimension variables, wherein each dimension variable represents the energy content ($G(f_{eigen1})$, $G(f_{eigen2})$, $E_1$, $E_2$) of the oscillation behavior of the wheel at a frequency ($f_{eigen1}$, $f_{eigen2}$) or in a frequency range ($f_{eigen1}-\Delta f_1$, $f_{eigen1}+\Delta f_1$, $f_{eigen2}-\Delta f_2$, $f_{eigen2}+\Delta f_2$).

4. The method as claimed in claim 1, wherein a frequency analysis is carried out on the oscillation behavior of the wheel, and the characteristic variable (α/v) is determined from a frequency spectrum.

5. The method as claimed in claim 4, wherein the oscillation behavior of the wheel is an angular velocity signal (ω) from the wheel, and the frequency spectrum is determined by Fourier transformation.

6. The method as claimed in claim 4, wherein the characteristic variable (α/v) is determined as a ratio ($A_{ratio}$)
   of the amplitude values ($G(f_{eigen1})$, $G(f_{eigen2})$) of the frequency spectrum at two predetermined or determined resonant frequencies ($f_{eigen1}$, $f_{eigen2}$), or
   the energy contents of the frequency spectrum in the region of two predetermined or determined frequency ranges ($f_{eigen1}-\Delta f_1$, $f_{eigen1}+\Delta f_1$; $f_{eigen2}-\Delta f_2$, $f_{eigen2}+\Delta f_2$).

7. The method as claimed in claim 1, wherein the characteristic variable (α/v) is determined from the time profile of an angular velocity signal (ω) from the wheel.

8. The method as claimed in claim 7, wherein the characteristic variable (α/v) is determined by filtering by at least one bandpass filter.

9. The method as claimed in claim 7, wherein the angular velocity signal (ω) from the wheel is filtered by at least one bandpass filter, whose cut-off frequencies ($f_{eigen1}-\Delta f_1$, $f_{eigen1}+\Delta f_1$; $f_{eigen2}-\Delta f_2$, $f_{eigen2}+\Delta f_2$) are located around a predetermined or determined resonant frequency ($f_{eigen1}$, $f_{eigen2}$), and wherein the characteristic variable (α/v) is determined from the variance of the filtered signal.

10. The method as claimed in claim 9, wherein the characteristic variable (α/v) is determined from a ratio ($A_{ratio}$) of the variances of two signals which have been filtered by bandpass filters with different cut-off frequencies.

11. The method as claimed in claim 1, wherein a model-based analysis is carried out of the oscillation behavior of the wheel, and wherein at least one parameter ($J_{rim}$, $J_{radial\ belt}$, c) of the basic model or of the basic model-based equation is determined, and wherein the characteristic variable (α/v) is determined from the determined parameter or parameters.

12. The method as claimed in claim 11, wherein the oscillation behavior of the wheel is an angular velocity signal (ω) from the wheel, and the at least one parameter ($J_{rim}$, $J_{radial\ belt}$, c) of the basic model or of the basic model-based equation is determined by parameter estimation.

13. The method as claimed in claim 1, wherein a frequency analysis is carried out of the oscillation behavior of the wheel, and wherein the pressure loss identification variable (X) is a resonant frequency ($f_{eigen}$) determined on the basis of the frequency analysis.

14. The method as claimed in claim 13, wherein the oscillation behavior of the wheel is an angular velocity signal ($\omega$) from the wheel.

15. The method as claimed in claim 13, wherein a value of the characteristic variable ($\alpha/v$) is determined for each determined frequency spectrum, and wherein frequency spectra are averaged using values of the characteristic variable ($\alpha/v$) which are located within a predetermined value range, wherein the pressure loss identification variable ($f_{eigen}$) is determined from the averaged frequency spectrum.

16. The method as claimed in claim 1, wherein a model-based analysis is carried out of the oscillation behavior of the wheel, wherein at least one parameter ($J_{rim}$, $J_{radial\ belt}$, c) of the basic model or of the basic model-based equation is determined, and wherein the pressure loss identification variable (X) is a parameter of the model (c) or is determined ($f_{eigen}$) from the parameter or parameters of the model.

17. The method as claimed in claim 16, wherein the oscillation behavior of the wheel is an angular velocity signal ($\omega$) from the wheel, and the at least one parameter ($J_{rim}$, $J_{radial\ belt}$, c) of the basic model or of the basic model-based equation is determined by parameter estimation.

18. The method as claimed in claim 1, wherein a decision is made as a function of the characteristic variable ($\alpha/v$) as to whether or not a pressure loss identification variable (X, f, c) is used for pressure loss monitoring.

19. The method as claimed in claim 1, wherein in a learning phase, value pairs are learnt for the characteristic variable ($\alpha/v$) and for the pressure loss identification variable (X, f, c) as comparison values, wherein currently determined value pairs are compared with these comparison values in a pressure loss monitoring phase, in order to identify tire pressure loss.

20. The method as claimed in claim 1, wherein in a learning phase, value pairs are learnt for the characteristic variable ($\alpha/v$) and for the pressure loss identification variable (X, f, c), wherein a functional relationship (g) between at least the characteristic variable ($\alpha/v$) and the pressure loss identification variable (X, f, c) is determined from the value pairs, and wherein a pressure loss identification is carried out in a pressure loss monitoring phase on the basis of a currently determined pressure loss identification variable (X, f, c) and the determined functional relationship (g).

21. The method as claimed in claim 20, wherein the pressure loss identification is carried out with a currently determined pressure loss identification variable (X, f, c) being corrected on the basis of the functional relationship (g).

22. The method as claimed in claim 1, wherein a gradient ($\alpha$) of the wheel torque slip curve is determined from the characteristic variable ($\alpha/v$), and any change in a coefficient of friction ($\mu$) between the roadway and the tire and/or any load change (Fz) of the vehicle are/is determined on the basis of the gradient ($\alpha$).

23. A tire pressure monitoring system, in which the wheel rotation speed ($\omega$) of at least one wheel, or a variable which is related to the wheel rotation speed of the wheel, is determined and is evaluated for identification of the tire pressure loss, comprising an evaluation unit in which a method as claimed in claim 1 is carried out.

* * * * *